United States Patent [15] 3,636,376
Hoffmann [45] Jan. 18, 1972

[54] LOGIC NETWORK WITH A LOW-POWER SHIFT REGISTER

[72] Inventor: Kurt Hoffmann, Sunnyvale, Calif.
[73] Assignee: Fairchild Camera and Instrument Corporation, Long Island, N.Y.

[22] Filed: May 1, 1969
[21] Appl. No.: 821,019

[52] U.S. Cl. ....................307/221 B, 307/208, 307/252 K, 307/288, 328/37
[51] Int. Cl. ....................H03k 17/00, G11c 19/00
[58] Field of Search ....................307/221, 289, 220–225, 307/252 K, 208, 221 B, 288; 328/37

[56] References Cited

UNITED STATES PATENTS

| | | | |
|---|---|---|---|
| 3,165,647 | 1/1965 | Debottari | 307/288 |
| 3,237,021 | 2/1966 | Jenkins | 307/288 |
| 3,381,137 | 4/1968 | Brown | 307/288 |
| 3,383,521 | 5/1968 | Greenburg | 307/221 B |
| 3,469,110 | 9/1969 | Sherman | 307/288 |
| 3,482,114 | 12/1969 | Marshall | 307/221 B |
| 3,152,268 | 10/1964 | Somlyody | 307/221 |
| 3,496,475 | 2/1970 | Arnold | 307/221 |
| 3,510,680 | 5/1970 | Cogar | 307/221 |

OTHER PUBLICATIONS

Ernst, Richard J., GE Semiconductor Products Newsletter, Vol. 5, No. 3, Dec. 1961, p. 7.

*Primary Examiner*—Donald D. Forrer
*Assistant Examiner*—David M. Carter
*Attorney*—Roger S. Borovoy and Alan H. MacPherson

[57] ABSTRACT

A low-power binary shift register in which power consumption is a function of the binary content rather than the number of stages. Each stage includes a pair of transistors which are either in saturated conduction, representing a binary 1, or in a cutoff state of conduction, representing a binary 0. Two clockable gates are also included in each stage. One of these gates switches the transistors of an adjacent stage to conduction to store a 1 if the transistors of its stage store a 1, while the other gate resets the transistors of its stage to a cutoff state to thereby define the storing of a binary 0.

15 Claims, 12 Drawing Figures

PATENTED JAN 18 1972

3,636,376

KURT HOFFMANN
INVENTOR.

BY [signature]
[signature]
ATTORNEYS

KURT HOFFMANN
INVENTOR.
BY
Leopold Bornay
Alan H. MacPherson
ATTORNEYS

KURT HOFFMANN
INVENTOR.
BY
ATTORNEYS

INVENTOR.
KURT HOFFMANN
BY [signature]
Alan H. MacPherson
ATTORNEYS

INVENTOR.
KURT HOFFMANN
BY Roger L Borovoy
Alan H. MacPherson
ATTORNEYS

INVENTOR.
KURT HOFFMANN
BY [signature]
Alan H. MacPherson
ATTORNEYS

INVENTOR.
KURT HOFFMANN
BY Lloyd Borovy
Alan H. MacPherson
ATTORNEYS

LOGIC NETWORK WITH A LOW-POWER SHIFT REGISTER

BACKGROUND OF THE INVENTION

1. Field of the Invention

The present invention relates to binary logic circuitry of the type which comprises and/or includes a shift register and, more particularly, to binary logic circuits which incorporate a novel shift register, which requires a minimum of power for its operation.

2. Description of the Prior Art

At present, there are many applications in which multistage binary shift registers are employed. Some are of the serial input serial output type, while others operate in a parallel input serial output mode. Still others are operable in a serial input parallel output arrangement. As is appreciated, in a binary shift register, each stage is designed to be in either of two quiescent states, one state representing a binary logic 1 and the other representing the binary logic 0. Shifting is generally accomplished by clocking the various stages to shift the binary information contained therein from each stage to an adjacent stage.

In recent years, with the development of Medium Scale Integration (MSI) and Large Scale Integration (LSI) techniques, registers have been developed which though comprising many stages occupy a very small volume of space. This is due to the ability to produce large numbers of solid-state devices such as transistors and diodes, which are physically extremely small. Though such multistage circuits operate satisfactorily, one of their major disadvantages is the relatively high power which they require. This is primarily due to the fact that in a prior art shift register each stage consumes power, irrespective of the type of binary information contained therein. Thus, the power consumption is not dependent on the information content, but rather, on the number of stages of the register. Unfortunately, the relatively large power consumption necessitates the incorporation of circuitry and components which greatly increase the overall size of the register. Consequently, the advantages gained by the employment of MSI or LSI techniques is greatly reduced. Thus, a need exists for a shift register in which its power consumption is reduced by making its power requirements independent of the number of stages thereof.

OBJECTS AND SUMMARY OF THE INVENTION

A primary object of the present invention is to provide a new improved shift register.

A further object of the present invention is to provide a new improved solid-state shift register which is implementable by presently known integration techniques.

Another object of the present invention is to provide a new improved shift register which requires less power for its operation than comparable similar prior art registers.

Still another object of the present invention is to provide a highly reliable shift register in which power consumption is substantially independent of the number of stages thereof.

Still a further object of the present invention is to provide a novel binary stage of the type which may be incorporated in a multistage shift register, the stage being of the type which consumes power as a function of the binary information contained therein.

These and other objects of the present invention are achieved by providing a basic stage for use in a shift register, wherein the stage comprises a binary memory cell which is switchable between two different quiescent states, one of which represents a binary one (1) and the other a binary zero (0). In one quiescent state two solid-state devices, hereinafter referred to as the cell's transistors, are in a fully saturated conductive state, while in the other quiescent state, the two transistors of the cell are in a nonconductive state. For explanatory purposes, it is assumed herein that the conductive state represents a binary 1 and the nonconductive state a binary 0. The cell is designed so that only when the two transistors are in conductive saturation does the cell consume power. On the other hand, in the nonconductive state the cell exhibits a very high impedance so that the power consumed therein is extremely small and therefore the cell may be assumed not to require any power when storing a binary 0. Thus, the cell's power consumption is a function of the binary information contained therein.

In accordance with the teachings of the present invention, each stage, in addition to the binary memory cell also includes a pair of gates, which together may be thought of as gating means. These gating means are clockable to control the transfer of a binary 1 stored in the cell of its respective stage to the cell of another stage in the shift register, as well as to switch its respective cell to its quiescent nonconductive state. In accordance with the teachings of the present invention, a low power shift register is implementable by incorporating a plurality of identical novel stages to provide a shift register in which the power consumption is only a function of the number of stages in which binary ones are stored, rather than the absolute number of stages of the register as is the case in the prior art.

The novel teachings of this invention are applicable to a shift register in which only one of any two successive or adjacent stages is in a quiescent saturated conductive state. That is, only one of any two successive stages stores a binary 1. For explanatory purposes the invention will be described in conjunction with embodiments of novel shift registers in which only one stage stores a binary 1 and all the other stages store binary 0's.

The novel features of the invention are set forth with particularity in the appended claims. The invention will best be understood from the following description when read in conjunction with the accompanying drawings.

BRIEF DESCRIPTION OF THE DRAWINGS

FIG. 4 is a multiwave diagram, useful in explaining the operation of the register shown in FIGS. 1 and 3;

DESCRIPTION OF THE PREFERRED EMBODIMENTS

Figures 1, 2:
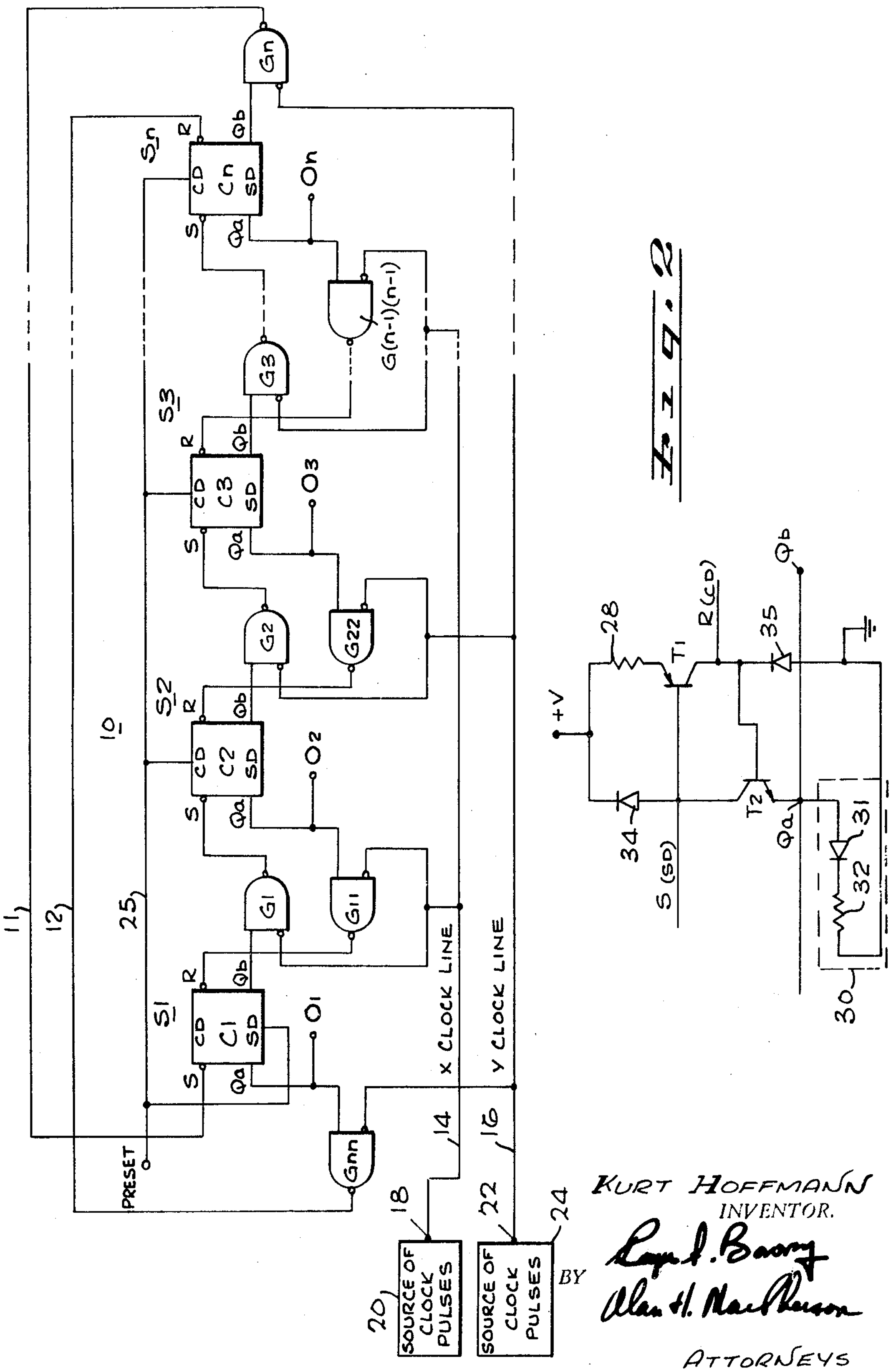
FIG. 1 is a block diagram of one embodiment of a shift register in accordance with the teachings of the present invention.
FIG. 2 is a schematic diagram of a binary memory cell.

Reference is now made to FIG. 1 which is a block diagram of a novel circulating shift register 10 constructed in accordance with the present invention. Register 10 comprises $n$ stages, designated S1 through S$n$, where the last stage, S$n$, is connected to the first stage S1 by means of lines 11 and 12. In the particular embodiment, $n$ is assumed to be an even number. Stage S1 comprises a binary memory cell C1 and a pair of gates G1 and G11, with the stage's suffix 1 being used to designate the cell and gates thereof. Likewise, each one of the other stages comprises a cell C and a pair of gates which are identified by the stages numerical suffix. Each cell, such as C2 has a terminal S connected to the output of one of the gates of the preceding stage such as G1, while a terminal R of C2 is connected to the output of G22. Terminal Q$b$ of C2 is connected to one input of G2 while a terminal Q$a$ of C2 is connected to one input of gate G11 of the preceding stage S1.

One input of each of the two gates of each stage is connected to one of two clock lines 14 and 16, which hereafter may also be referred to as the $x$ clock line and $y$ clock line, respectively. The gates of the odd-numbered stages are connected to the $x$ clock line, while the gates associated with the even-numbered stages are connected to the $y$ clock line. Line 14 is assumed to be connected at a terminal 18 to a first source of clock pulses designated by numeral 20, while line 16 is assumed to be connected at a terminal 22 to another source of clock pulses, which is designated generally by reference numeral 24. The pulses from source 20 will hereafter be referred to as the $x$ clock pulses, while those from source 24 will be referred to as the $y$ clock pulses.

As further shown in FIG. 1, each of the cells is assumed to include a Direct Set terminal, designated SD, and a Direct Clear terminal, designated CD. In the particular embodiment, it is assumed that SD of C1 and the terminals CD of all the other stages are connected to a preset line 25, so that when an appropriate preset pulse is applied to line 25 from a presetting source (not shown) cell C1 is driven to store a binary 1 and all the other cells are driven to states which represent binary 0's. This is accomplished, as will be described hereafter, by driving cell C1 to be in a saturated conductive state and by driving the other cells to be in a quiescent nonconductive state. In such an arrangement, in accordance with the teachings of the present invention, only stage S1 consumes power, while all the other stages which are in their quiescent nonconductive state represent very high impedances so that the power consumption thereof is assumed to be negligible.

Before proceeding to describe FIG. 2, which is a simplified schematic diagram of a typical binary memory cell, C, and FIG. 3 which is a schematic diagram of the shift register 10 shown in FIG. 1, the operation of shift register 10 will be described briefly. In this embodiment, assuming that cell C1 is in a quiescent saturated conductive state, storing a binary 1 and all the other cells store binary 0's, upon the application of a $x$ clock pulse from source 20, gate G1 is activated switching cell C2 of the adjacent stage S2 to a fully saturated conductive state. Simultaneously with the switching of C2 to its conductive state, the $x$ clock pulse supplied by source 20 activates gate G11, causing its output, which is connected to C1, to switch the latter to its quiescent nonconductive state. Thus, after the application of the first $x$ clock pulse only cell C2 is in a conductive state, thereby storing the binary 1, previously stored in C1, and cell C1, having been reset by G11 is in its nonconductive state storing a binary 0. As a result, the single binary 1, previously stored in C1, has been shifted to cell C2 of S2.

The first $y$ clock pulse from source 24 performs functions identical with those performed by the first $x$ clock pulse. That is, the first $y$ clock pulse activates G2 so that as a result of the conductive state of C2, cell C3 is switched to its conductive state. At the same time, G22, in response to the $y$ clock pulse supplied thereto from source 24 and the conductive state of C3 to which it is connected, is activated, resetting C2 to its nonconductive state. Consequently, the binary 1 is shifted, in response to the first $y$ clock pulse from stage S2 to S3. In FIG. 1, as well as in all the other Figures to be described hereafter, the small circle adjacent an input or output terminal of any gate represents a negative pulse which is required to activate the gate or which is provided by the gate when the gate is activated.

Attention is now directed to FIG. 2 which is a schematic diagram of a basic binary memory cell. The cell is assumed to comprise a pair of transistors designated T1 and T2 of opposite conductivity type, T1, being shown as a PNP-transistor and T2 as a NPN-transistor. The base of T1 and the collector T2 are tied together, with the junction point assumed to represent the terminal S or the Direct Set (SD) terminal. The collector and base of T1 and T2, respectively, are interconnected to define terminal R or the Direct Clear (CD) terminal herebefore referred to. The emitter of T1 is connected to a source of potential such as +V through a resistor 28, while the emitter of T2 is connected to a reference potential such as ground through a current conductive network, generally designated by numeral 30. In one particular embodiment, the emitter of T2 is connected to ground through a diode 31 which is connected in series with a resistor 32. The emitter of T2 is assumed to be connected to both the Q$a$ and Q$b$ output terminals of the cell. To compensate for current leakages, the base of T2 is connected to +V through a diode 34, while the base of T2 is likewise connected to ground through a diode 35. In order to simplify the following Figures, diodes 34 and 35 will be omitted.

As hereinbefore indicated, the cell is assumed to be switchable between two quiescent states of operation. One state is represented by the two transistors T1 and T2 being in a fully saturated conductive state, which hereinbefore has been defined as representing a binary 1. The other quiescent state of the cell is one in which both transistors are cut off with no current conducting through either of them to represent a binary 0. When the cell is in a nonconductive state a negative pulse of sufficient amplitude, applied at terminal S switches transistor T1 into conduction, as a result of which, T2 is also switched into conduction. The two transistors remain in full or saturated conduction until disrupted by an external resetting signal. In the present invention, this signal is assumed to be applied at terminal R in the form of a negative pulse of sufficient amplitude, which when applied switches transistor T1 to cut off, in turn cutting off transistor T2.

Thus, when the cell is in its quiescent nonconductive state, representing a binary 0, it may be switched to store a binary 1 by applying a negative signal to its S terminal. On the other hand, when the cell is in a fully saturated conductive state, thereby representing a binary 1, it may be reset to represent a binary 0 by the application of a negative pulse at its R terminal. When the cell stores a binary 1, output terminals Q$a$ and Q$b$ are at a high potential, substantially equal to +V less the voltage drops across two conductive transistors and resistor 28. On the other hand, when the cell stores a binary 0, i.e., it is in a nonconductive state, the potential at terminals Q$a$ and Q$b$ is substantially equal to ground. The cell requires power only when a binary 1 is stored therein. On the other hand, when a binary 0 is stored therein, i.e., the two transistors are completely cut off, the current from +V flowing to ground to substantially zero and therefore the cell may be assumed not to consume any power.

Figure 3:
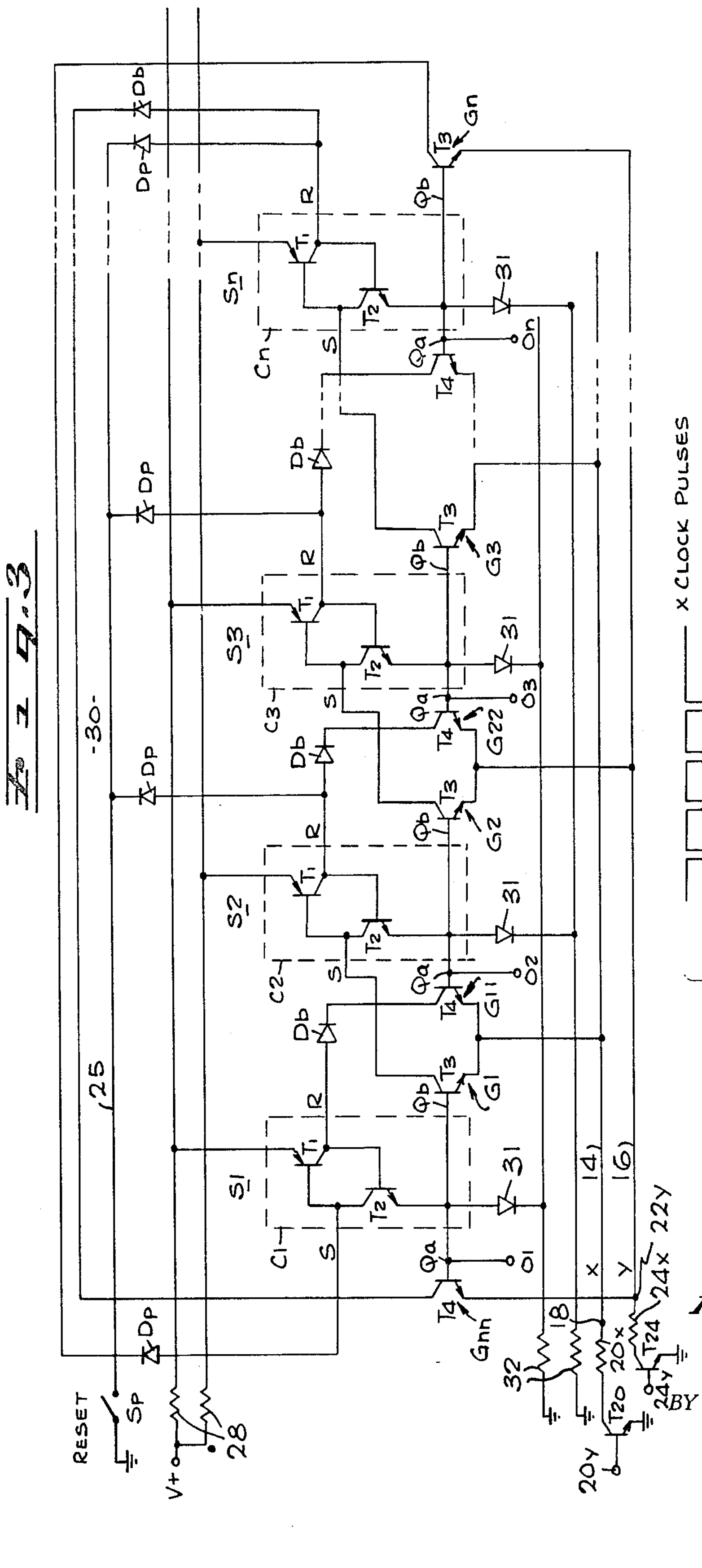
FIG. 3 is a schematic diagram of the shift register shown in FIG. 1.
Figure 2:
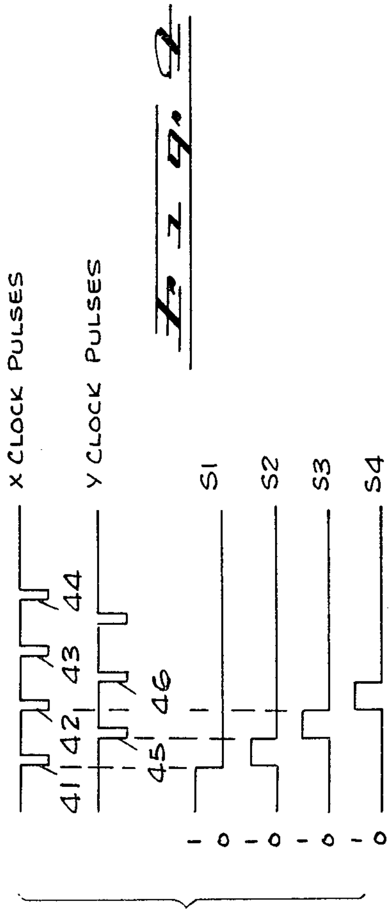

Reference is now made to FIG. 3 which is a schematic diagram of the shift register 10 shown in block form in FIG. 1. In FIG. 3, circuits and elements like those shown in FIGS. 1 and 2 are designated by like numerals. In FIG. 3, G1 is shown comprising a NPN-transistor T3 whose base, connected to the Q$b$ terminal of C1, represents one of its inputs. The emitter of T3, connected to the $x$ pulse line 14, represents another of its inputs. The collector of T3, which is connected to the S terminal of C2 of the adjacent state S2, represents the output of G1. Likewise, the gate G11 assumes the form of a NPN-transistor T4 whose emitter represents one input terminal, the base, which is connected to the Q$a$ terminal of C2 represents the other input terminal and the collector of T4 represents the output terminal of G11. The collector is connected to the R terminal of the cell of its respective stage through a blocking diode designated $D_b$. The function of this diode is to block the flow of current from stage S2 to stage S1 when the former, in the quiescent saturated conductive state stores a binary 1 and the latter stores a binary 0.

As shown, the terminal 18 to which the $x$ pulse line 14 is connected is also connected to the source of clock pulses 20, which in FIG. 3 is shown comprising a transistor T20, whose emitter is connected to ground and its collector connected through a resistor 20$x$ to terminal 18. The base of the transistor T20 is connected to a terminal 20$y$. Each positive clock pulse applied at terminal 20$y$ switches transistor T20 to its conductive state thereby pulling line 14 substantially to ground, so as to apply a negative clock pulse thereon. Likewise, terminal 22 to which the $y$ clock line 16 is connected is shown connected to a resistor 24$x$ which is connected to the collector of a transistor T24. The emitter of T24 is connected to ground and its base to a terminal 24*y*. A positive clock pulse at terminal 24*y* switches transistor T24 to its conductive state thereby lowering *y* clock line to ground to provide a negative pulse to each one of the emitters to which line 16 is connected.

In FIG. 3, the S terminal of C1 and the R terminal of each of the other cells is connected through a separate presetting diode designated $D_p$ to a presetting line 25. Line 25 is assumed to be connected to ground through a presetting switch designated SP, which when closed momentarily connects terminal S of C1 and terminal R of the other cells to ground so as to switch C1 to its conductive state and the other cells to their nonconductive states. Thus, a binary 1 is stored in S1 and the binary 0's in the other stages. The Q*a* terminal of each cell is connected to an output terminal designated 0, followed by the stage's numerical suffix. Thus, the state of conduction and thereby the binary information stored in each cell, such as C1, may be determined by monitoring the potential at the output terminal, such as 01.

From the foregoing it should thus be appreciated by those familiar with the art, that the shift register 10, shown in block form in FIG. 1 and in schematic form in FIG. 3 comprises a plurality of stages, each one of which includes a binary memory cell which in a quiescent state, i.e., at a time other than during the application of the clock pulses, is either in a fully saturated conductive state, or in a fully cutoff nonconductive state. Each stage includes a pair of gates, such as G1 and G11. Assuming that a cell stores a binary 1, when its associated gates are properly clocked, one of the gates, such as G1 activates the cell of an adjacent stage to switch the cell to its saturated conductive state, thereby transferring the binary 1 to the adjacent stage. At the same time, the other gate, such as G11 which is also clocked resets the cell of its corresponding stage so that it is switched to its nonconductive state and thereby represents a binary 0. Thus, the application of a proper clock pulse to the two gates results in the shifting of the binary 1 to an adjacent stage.

In the particular arrangement, the shifting is done from left to right. However, as will be pointed out hereafter in connection with another embodiment to be described, shifting may be produced to occur from right to left. Also, by incorporating a second pair of gates, properly pulsed from a separate source, shifting may be controlled to occur in either a left to right or right to left direction. From the foregoing it should further be appreciated, that in the shift register, hereinbefore described, since at any given time only one stage is assumed to store a binary one, only single cell is in its saturated conductive state in which power is consumed thereby. The other stages, however, all of which are assumed to store binary 0's have memory cells which are in their nonconductive states. Consequently, power consumption is not a function of the number of stages of the shift register, but rather, is directly related to the number of stages in which binary 1's are stored, which in the present example is limited to one. Thus, a very significant reduction in power consumption is realized.

The operation of the shift register 10 may be further summarized in connection with FIG. 4 to which reference is made herein. Therein, numerals 41–44 represent negative *x* clock pulses on line 14, while numerals 45–47 represent *y* clock pulses on line 16. Assuming that S1 stores a binary 1 prior to the application of *x* pulse 41, upon the application of pulse 41, C2 of S2 is switched to conduction to store a binary 1 and C1 of S1 is reset. Then, when the *y* clock pulse 45 is applied, the binary 1 is transferred to stage S3 and stage S2 is reset. Thereafter, when the second *x* clock pulse 42 is applied, the binary 1 is transferred from stage S3 to S4. Therefrom, it is apparent that the output frequency, i.e., the frequency at which the binary 1 is transferred from stage to stage is twice the frequency of either the *x* clock pulses or the *y* clock pulses. Defining the shifting frequency as $F_{out}$ and the clocking frequency as $F_{clock}$, $F_{out}=F_{clock}/1/2n$. Thus, for any desired output frequency, twice the number *n* of stages are required.

Figure 5:
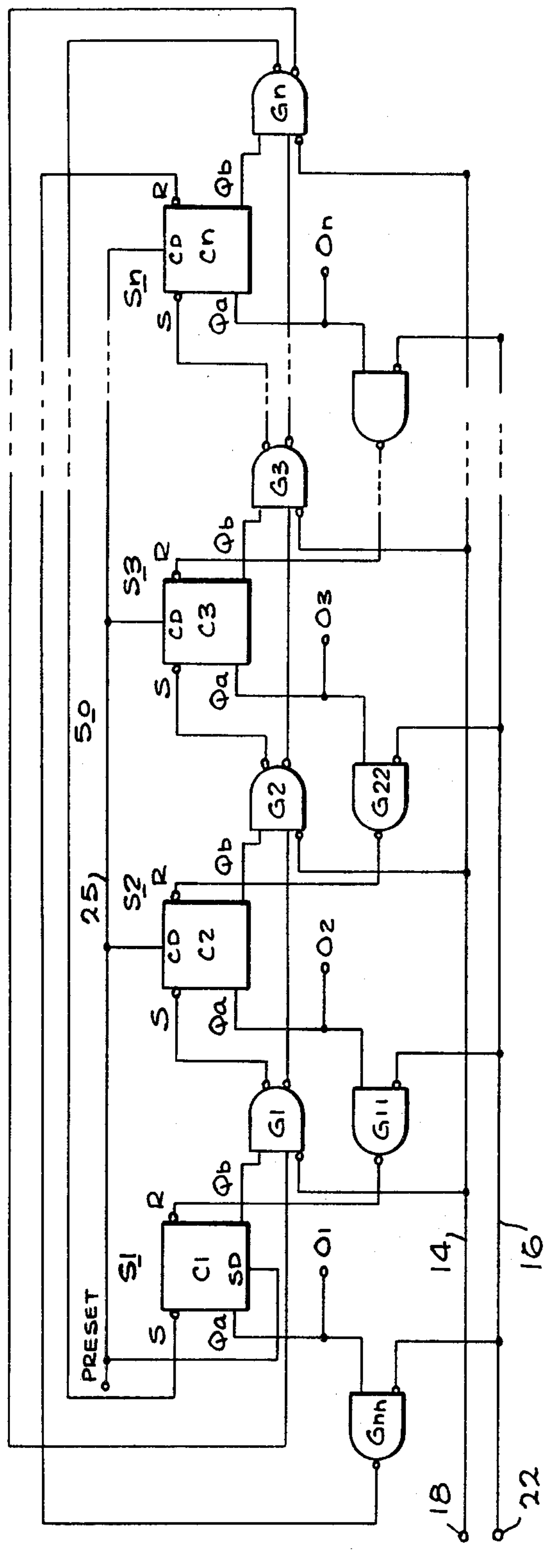
FIGS. 5 and 6 are block and schematic diagrams respectively of another embodiment of a shift register.
Figure 6:
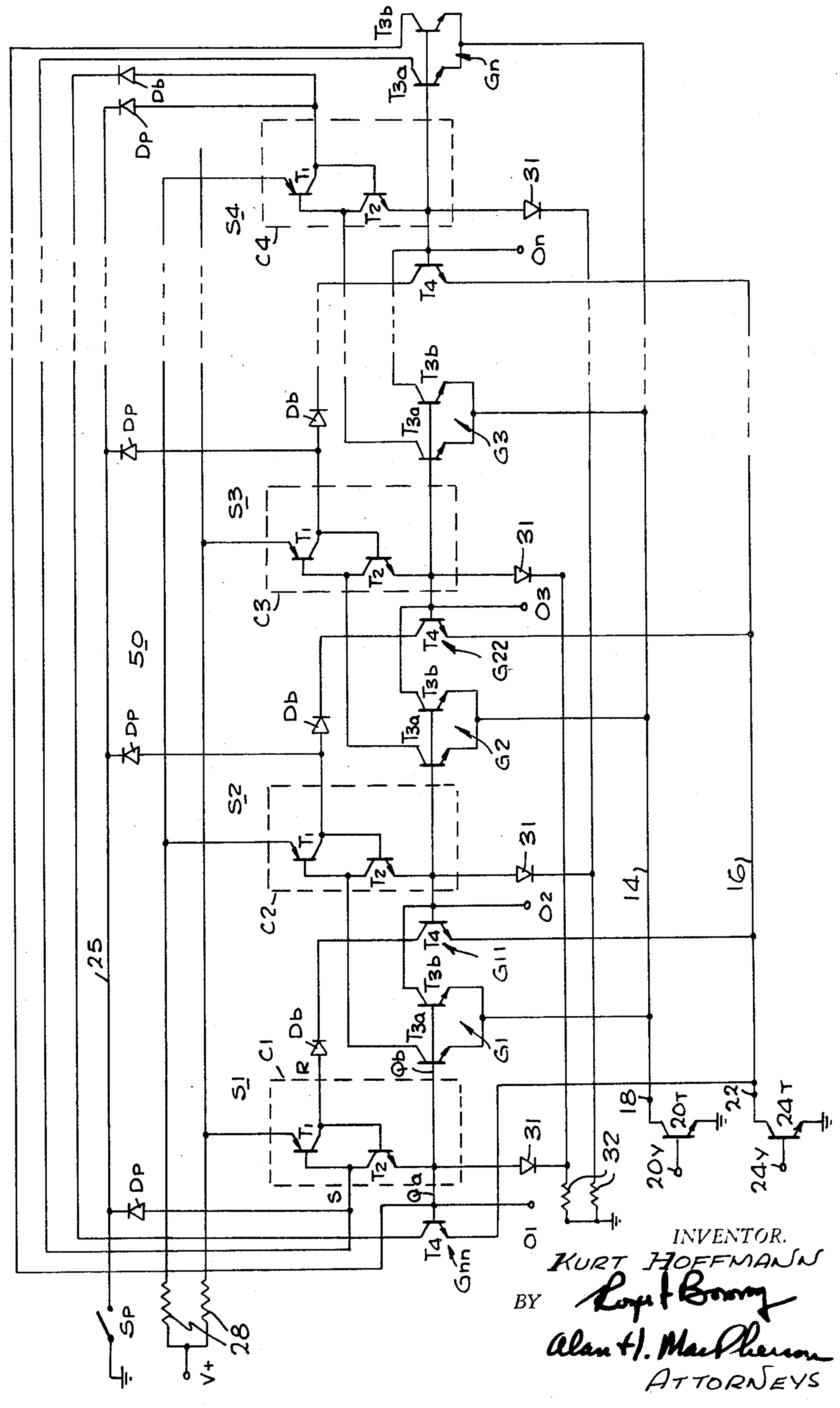

In order to reduce the number of binary cells or stages, the shift register 10 may be modified, as shown in FIGS. 5 and 6 to which reference is made herein. The modified shift register is designated by numeral 50. Whereas, in shift register 10 (see FIG. 1) the two gates of all the odd stages are connected to one clock line, and the gates of the even numbered stages to the other clock line, in shift register 50, the gates G1, G2, etc., are connected to the *x* clock line while the gates G11, G22, etc., are connected to the *y* clock line. In addition, however, the output of each of gates G1, G2, etc., is connected to another input of a corresponding gate in a succeeding stage. Thus, for example, the output of G1 is connected to another input of G2, the output of the latter is connected to another input of G3, etc. Briefly, the function of the latter-mentioned connection is to inhibit the cell to which a binary 1 is transferred from improperly activating and accidentally transferring the binary 1 to a succeeding cell thereof. In the particular diagram, shown in FIG. 5, assuming that C1 stores a binary 1 which upon the application of a negative *x* clock pulse, is transferred via gate G1 to C2, the inhibit connection between G1 and G2 is provided in order to inhibit cell C2 from transferring the one, supplied thereto via G2, to C3.

As seen from FIG. 6, gate G1 comprises a pair of transistors designated T3*a* and T3*b*. T3*a* performs the identical function performed by transistor T3 shown in FIG. 3. T3*b*, the additional transistor, has its collector connected to the Q*a* and Q*b* terminals of cell C2. As a result, when an *x* clock pulse is supplied, as T3*b* is activated it maintains the base of T3*a* of G2 at a potential close to ground so that even though a binary 1 is in C2, T3*a* of G2 is inhibited from accidentally transferring the same binary 1 to the next cell C3.

In operation, assuming that C1 stores a binary 1, and therefore is in a saturated conductive state, when the first *x* clock pulse is applied to line 14, gates T3*a* and T3*b* of G1 are activated. As a result, the cell C2 is switched to its saturated conductive state. As just indicated, T3*b* of G1 inhibits this state from being transferred through T3*a* of G2 to the next cell C3. Since the *x* clock pulse is only supplied to gate G1, G11 remains deactivated until an appropriate *y* clock pulse is supplied thereto via line 16. Thus, as long as G11 is not activated, both cells C1 and C2 are in their saturated conductive states. However, once the *y* clock pulse is applied to line 16, gate G11 is activated, applying a negative pulse to terminal R of C1 and thereby switching the cell to its nonconductive state, i.e., resetting it to store a binary 0. The next *x* clock pulse will activate the transistors of C2 to transfer the binary 1 from C2 to C3 as well as inhibit the transfer of the binary 1 to a succeeding cell C4. Then, when the next *y* clock pulse is applied, G22 is activated to reset C2.

Figure 7:
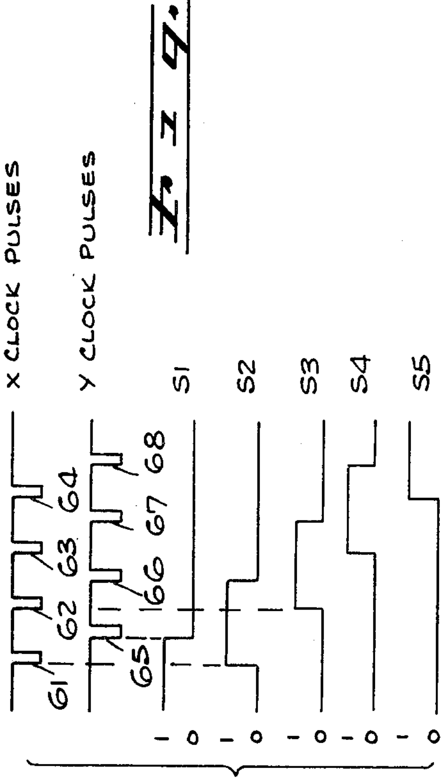
FIG. 7 is a multiwave diagram, useful in explaining the operation of the register shown in FIGS. 5 and 6.

The operation of the shift register 50 may be summarized in conjunction with FIG. 7 which is a multiline waveform diagram, similar to FIG. 4 hereinbefore used to explain the operation of shift register 10. In FIG. 7, reference numerals 61 through 64 represent four *x* clock pulses, while 65 through 68 designate four *y* clock pulses. Let it be assumed that before *x* pulse 61 is applied, stage S1 stores a binary 1. Then, when pulse 61 is applied, the binary 1 is transferred to S2 by switching its cell C2 to be in a conductive state, while at the same time cell C1 of S1 still remains in its conductive state. Then, when the first *y* clock pulse 65 is applied, S1 is reset by switching its cell C1 to its nonconductive state to represent a binary 0. Thus, after the application of the *y* clock pulse 65, and before the supply of the next *x* clock pulse 62, only cell C2 of S2 is in a conductive state, storing a binary 1 while all the other stages stores binary 0's. When *x* clock pulse 62 is applied, cell C3 of S3 is switched to its saturated conductive state to store a binary 1 as a result of the conductive state of C2 of S2. Then, the following *y* clock pulse 66 resets C2 of S2.

From the foregoing it should thus be apparent that *x* clock pulse 63 drives C4 of S4 to its conductive state and *y* clock pulse 67 resets C3 of S3. Similarly, *x* clock pulse 64 drives stage S5 to store a binary 1, while the subsequent *y* clock pulse 68 resets the previous stage S4 to store a binary 0. Comparing the shifting frequency of shift register 50 with the clock frequency of either the *x* clock pulses or the *y* clock pulses, it becomes apparent that the shifting or output frequency is equal to the clocking frequency. Thus, in register 50, the desired reduction in the number of stages which are required as compared with those required in shift register 10 is realized.

Figure 8:
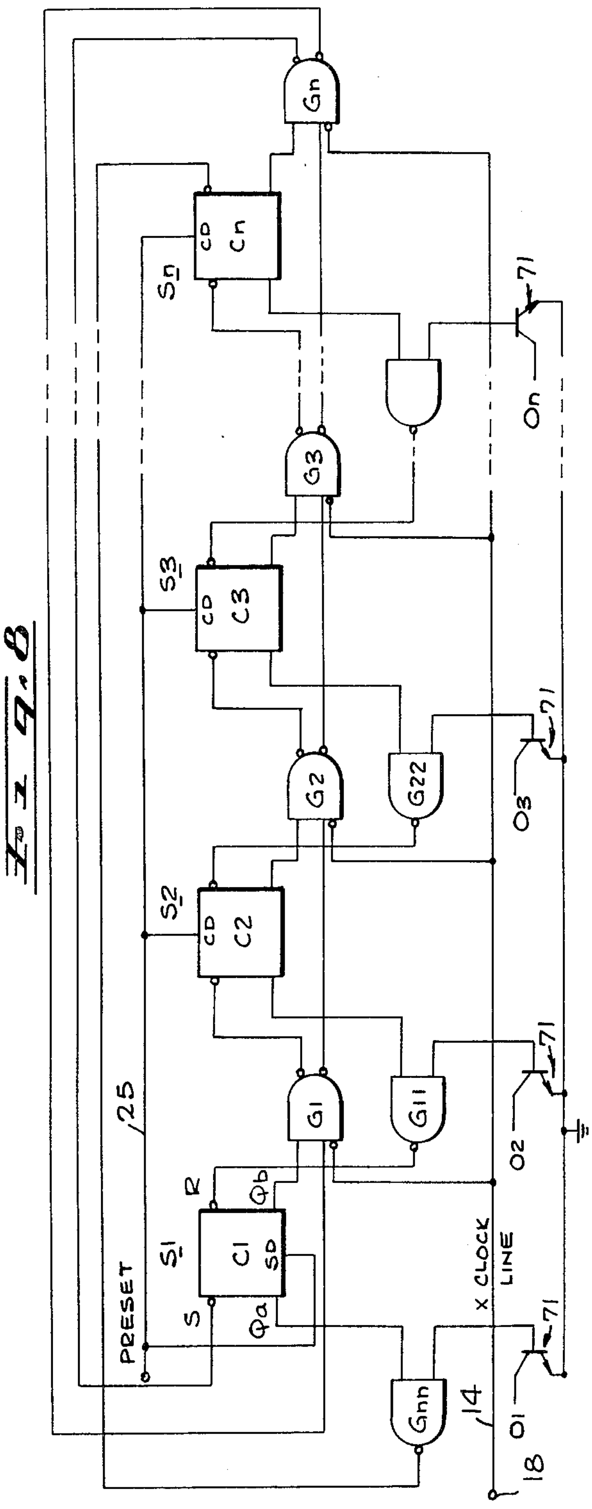
FIGS. 8 and 9 are block and schematic diagrams respectively of yet another embodiment of a novel shift register.

In either of the two embodiments hereinbefore described, two separate sources of clock pulses, designated 20 and 24, are required in order to produce the *x* and *y* sequences of clock pulses. Such a requirement may be eliminated in the embodiment of a shift register 70 shown in block form in FIG. 8 and in schematic form in FIG. 9 to which reference is made herein. As shown, the clock inputs of gates G1, G2, G3, etc., are connected to the single *x* clock line 14. However, the clocked inputs of gates G11, G22, etc., unlike the arrangements in the embodiments hereinbefore described, are not connected to another clock line. Rather, they are connected to ground through respective solid-state current-conducting elements designated by numeral 71. Preferably, these elements are transistors, with the base to emitter junction of each being connected between the gate, such as G11, and ground, while the collector is used as the stage's output terminal. Thus, as shown, output terminal O2 of stage S2 is represented by the collector of transistor 71. If desired, each of elements 71 may be replaced by a conventional diode.

Figure 9:
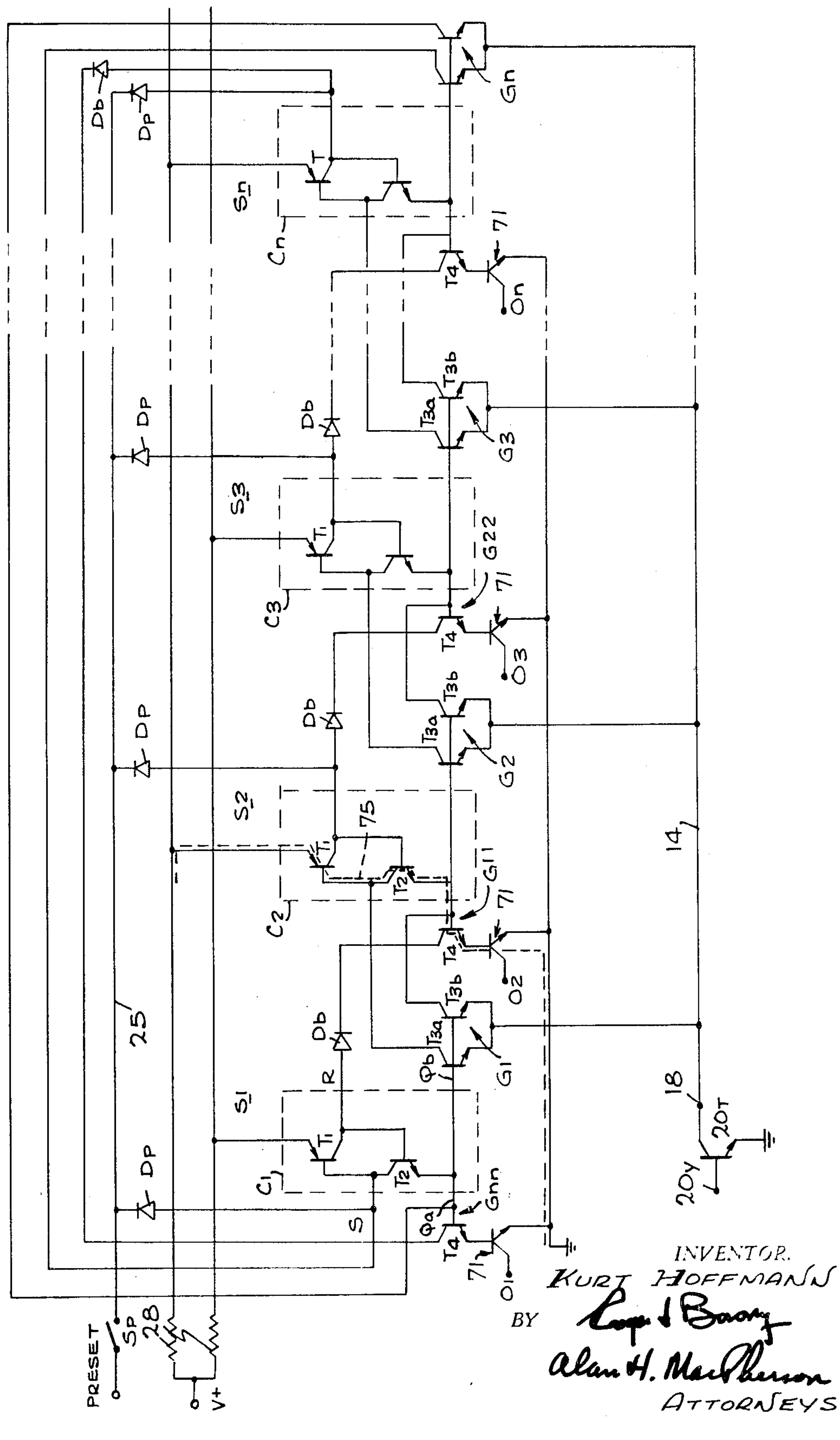

The manner in which shift register 70 operates may best be described in conjunction with FIG. 9. Let it be assumed that stage S2 stores a binary 1 by having its cell C2 in its saturated conductive state and the remaining cells storing a binary 0. In this conductive state, current conducts through T1 and T2 of C2 as well as through transistor T4 of gate G11 of the preceding stage and through transistor 71 which is connected between gate G11 and ground. The path of current flow is represented in FIG. 9 by dashed line 75. The shift register 70 remains in this quiescent state, with S2 storing a binary 1 and all the other stages storing binary 0's until the first clock pulse is applied to line 14. Upon the application of the clock pulse, transistor T3*a* of gate G2 starts to conduct and thereby provides a current path therethrough for the current which conducts through the transistors of C2. As a result, transistor T4 of gate G11 and transistor 71 connected thereto are cut off.

The conduction of transistor T3*a* of gate G2, combined with the fact that cell C2 is in a saturated conductive state, causes the transistors of cell C3 to be switched to their saturated conductive state. When the latter are conductive, terminal Q*a* of C3 is sufficiently above ground switching transistor T4 of G22 and the transistor 71 connected to it to their conductive states. Thus, the latter two transistors provide a current path for the current which conducts through the transistors T1 and T2 of C3. Also, when transistor T4 of G22 is switched to its conductive state, it applies a negative pulse to the terminal R of cell C2, thereby resetting it to its nonconductive state to store a binary 0 therein. Consequently, the application of a single clock pulse to line 14 results in the transfer or shifting of the binary 1 from cell C2 of S2 to cell C3 of S3. Transistor T3*b* of gate G2 provides gate G3 with the inhibit signal, as hereinbefore explained. From the foregoing it is thus seen, that in the shift register 70 shown in FIG. 9 the shifting of the binary 1 from one stage to the next is accomplishable by clocking the gates with clock pulses on a single clock line.

Figure 10:
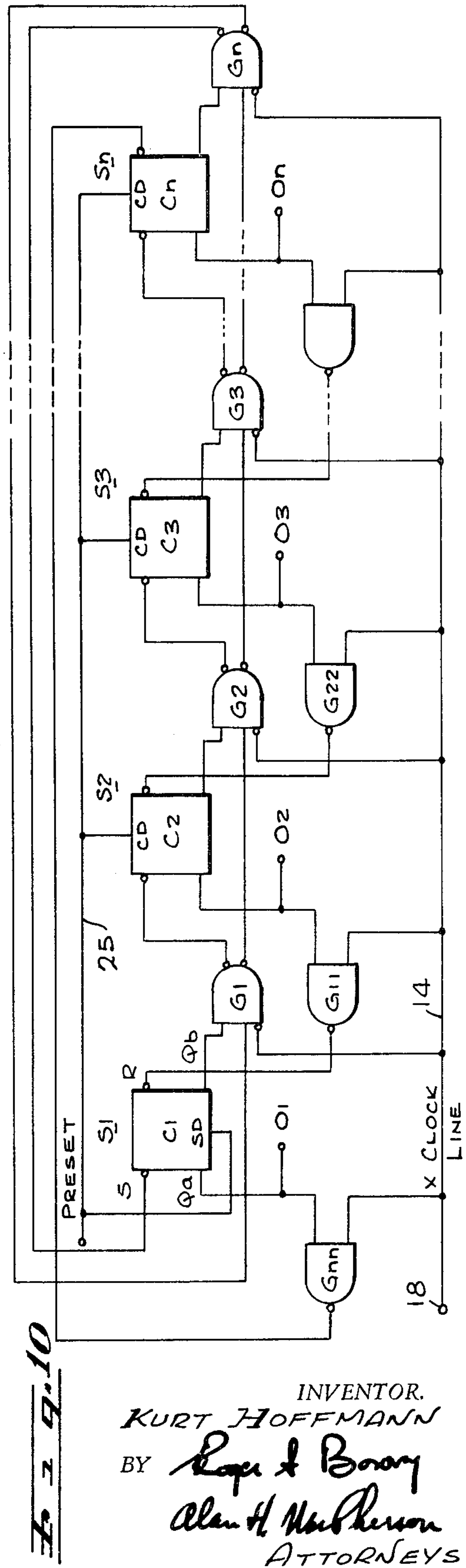
FIGS. 10 and 11 are block diagrams of two different embodiments of the novel shift register.

In the foregoing description of shift register 70 (FIGS. 8 and 9), the control inputs of gates G11, G22, etc., are assumed to be connected to ground through respective transistors 71. If desired, the control inputs of these gates, represented by the emitters of transistors T4 may be connected to *x* clock line 14, so that in the absence of a negative clock pulse on line 14, the line is at a high or positive potential. Consequently, one of gates G11, G22 is enabled. The gate which is enabled depends on which of the cells is in its saturated conductive state. Such an embodiment of register 70 is shown in block form in FIG. 10.

Figure 11:
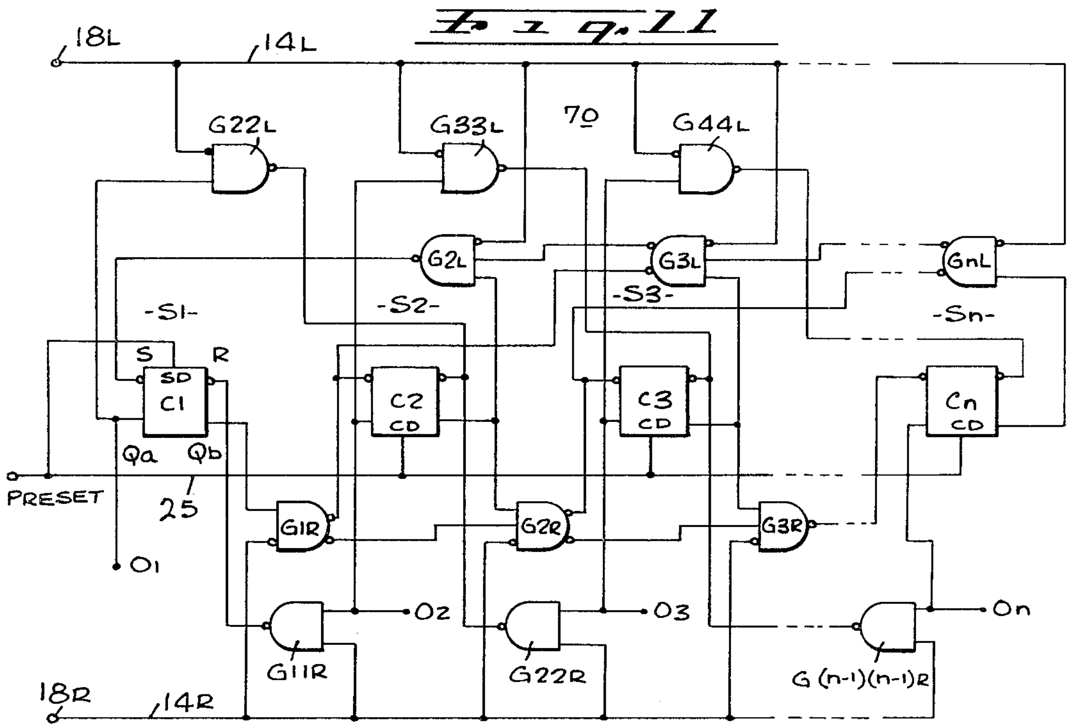

In all of the foregoing described embodiments of the shift registers, shifting is assumed to be from left to right. If desired, the cells C1, C2, etc., may be interconnected with the gates G1–*Gn* and G11–*Gnn* to produce right to left shifting Also, by incorporating in each stage a second pair of gates and a separate source of clock pulses, shifting in either direction may be realized. An embodiment of register 70 with a capability of shifting in both directions is diagrammed in FIG. 11 to which reference is made herein. Therein, the suffix R is used to designate the various gates, clock lines and source of clock pulses for shifting to the right, while the suffix L designates those elements needed for shifting to the left.

It should be appreciated that although in all of the shift registers, herebefore described, shifting is produced from one stage to an adjacent stage either to the right or to the left, the stages may be interconnected so that the binary 1 stored in any particular stage is shifted to any other selected stage, not necessarily an adjacent one. Such an arrangement enables the use of the low power shift register to form a generator of a selected code defined by the particular interconnections between the stages. Also, it should be appreciated that any of the foregoing described embodiments of the low power shift register may be combined with a diode matrix to form a low power binary counter.

Figure 12:
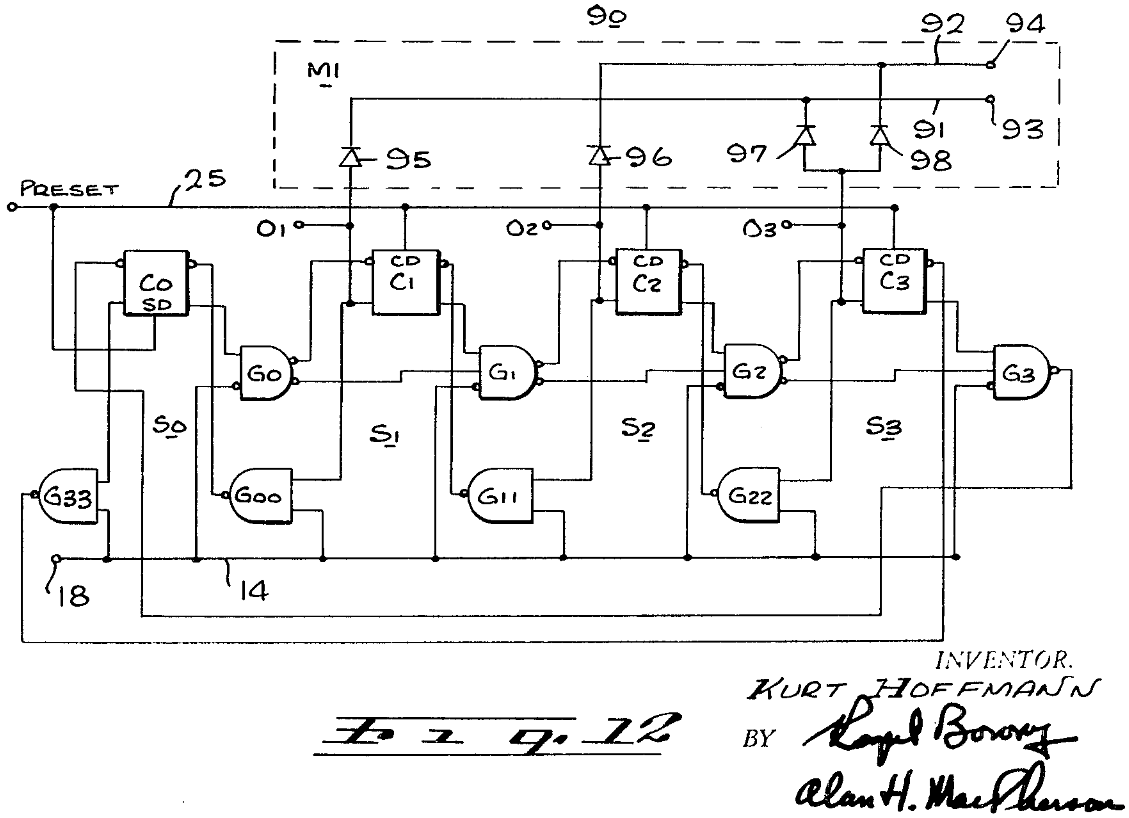
FIG. 12 is a block diagram of a novel low power binary counter.

One such embodiment of a 2-bit counter 90 is shown in FIG. 12 to which reference is now made. The counter 90 comprises four stages S0–S3 which are assumed to be preset so that S0 stores a binary 1, and stages S1–S3 store binary 0's. The outputs of stages S1–S3 are connected to a matrix M1 comprising lines 91 and 92 which terminate at terminals 93 and 94, respectively.

After presetting, when the first clock pulse is applied to line 14, stage S1 is driven to store a binary 1 thereby forward biasing a diode 95. Consequently, line 91 is at a high potential, indicated at terminal 93. The next clock pulse shifts the binary 1 from S1 to S2 thereby forward biasing a diode 96 so that line 92 and terminal 94 are at a high potential, and line 91 returns to a lower potential. Thus, the combined potential representation at terminals 93 and 94 represent the number 2 in binary form. The third clock pulse drives S3 to store a binary 1, and results in the resetting of S2. When S3 stores a binary 1, both diodes 97 and 98 are forward biased so that both lines 91 and 92 are at a high potential to represent the number 3 in binary form. Clearly, this embodiment may be expanded to form a counter of any desired bit length. It should further be clear that the matrix M1 may be incorporated with the register shown in FIG. 11 to form a reversible or Up-Down low-power counter.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. An integrated logic circuit comprising:

at least first and second interconnected stages coupled to a source of potential, each stage including a binary memory cell, switchable between a saturated conductive state, representative of a first binary value and a nonconductive cutoff state, wherein no electrical energy is consumed, representative of a second binary value; a clockable gating means including a first gate coupled between the output of the first stage and the input of the second stage so that when the cell of the first stage is in the saturated conductive state and a clock pulse is applied to the first gate, the cell of the second stage is switched to the saturated conductive state;

a second gate coupled between the input of the first stage and the output of the second stage so that when the cell of the second stage is in the saturated conductive state and a clock pulse is applied to the second gate, the cell of the first stage is switched to the nonconductive cutoff state; and means for presetting the cell of at least one stage to the conductive state and the cell of the other stage to the nonconductive state.

2. The arrangement as recited in claim 1 wherein said circuit includes *n* stages, *n* being greater than two, the stages being arranged in a sequence, with the gating means of each stage comprising first and second gates, coupled between the cell of their respective stage and the cell of an adjacent stage, said first and second gates being responsive to clock signals for switching the cell of the adjacent cell to its saturated conductive state and for resetting the cell of their respective stage to its nonconductive state if the cell of their respective stage prior to the application of the clock signals was in said saturated conductive state, said presetting means being coupled to said *n* stages to set at least one cell in its saturated conductive state with cells of the adjacent stages being preset to their nonconductive state.

3. The arrangement as recited in claim 2 wherein in the gating means of each stage said first gate has at least first and second input terminals and at least one output terminal, said coupling means including means coupling said first input terminal to the cell of the gate's respective stage and coupling said second input terminal to a clock line and further coupling the output terminal of said first gate to the cell of an adjacent stage, whereby upon the application of a clock pulse on said clock line, said first gate provides a signal at its output terminal switching the cell of the adjacent stage to its saturated conductive state if the cell of the gate's respective stage is in said saturated conductive state, said second gate having at least one input terminal and an output terminal and said means for coupling couple the input terminal of said second gate to the cell of the adjacent stage and the output terminal to the cell of the gate's respective stage for switching the latter cell to its nonconductive state when the cell of the adjacent cell is driven by said first gate to its saturated conductive state.

4. The arrangement as recited in claim 3 wherein each of said first and second gates comprises a single transistor having a base, an emitter and a collector, the base and emitter defining input terminals and the collector defining the output terminal.

5. The arrangement as recited in claim 4 wherein in each stage said first gate includes a third input terminal and a second output terminal, the second output terminal being connected to the third input terminal of the first gate of the succeeding stage to inhibit the switching of only the cell of the succeeding stage to the saturated conductive state.

6. The arrangement as recited in claim 4 wherein said first gate comprises first and second transistors, with the bases of the two transistors defining two of the first gate's input terminals, the emitters of the two transistors being connected to define the third input terminal of said first gate and the collectors of the two transistors defining the first gate's first and second output terminals.

7. A low power shift register comprising:

*n* identical stages coupled to a source of potential, and arranged in a sequence, each stage including a binary memory cell switchable between a saturated conductive state, representative of a first binary value, and a nonconductive cutoff state wherein no electrical power is consumed, representative of a second binary value, and, clockable gating means comprising:

a first gate coupled between the output of the cell of its respective stage and the input of the cell of the next succeeding stage so that when the cell of the respective stage is in the saturated conductive state and clock pulse is applied to the first gate the cell of the next stage is switched to the saturated conductive state; and, a second gate coupled between the input of its respective stage and the output of the next stage so that when the cell of the next stage is in the saturated conductive state and a clock pulse is applied to the second gate, the cell of the respective stage is switched to the nonconductive cutoff state;

means for presetting the cells of said *n* stages so that at least one selected cell is in its saturated conductive state, with the cells of stages adjacent said one cell to their nonconductive cutoff state.

8. The arrangement as recited in claim 7 wherein each cell includes a pair of interconnected transistors of opposite conductivity type and said clockable gating means include a pair of gates comprising a first clockable gate coupled to the two transistors of the cell of its respective stage and to the two transistors of the cell of the adjacent stage, for responding to a clock pulse to switch the two transistors of the cell of the adjacent stage to their saturated conductive state if the two transistors of the cell of its respective stage are in their saturated conductive state, said clockable gating means further including a second gate coupled to one of the transistors of the cell of the adjacent stage and to the two transistors of the cell of its respective stage for switching the latter transistors to their cutoff state if the transistors of the cell of the adjacent stage are in the saturated conductive state, whereby in the absence of a clock pulse only the transistors of at least one cell are in their saturated conductive state and the transistors of cells in preceding and succeeding stages in said sequence are in their nonconductive states.

9. The arrangement as recited in claim 8 further including a diode matrix coupled to the cells of the second through the *n*th stages, for providing an indication in binary from of the cell of said stages to which it is connected which is in said saturated conductive state.

10. The arrangement as recited in claim 8 wherein the clockable gating means of each stage include a first pair of gates coupled between the stage's cell and the cell of a succeeding stage viewed from left to right for shifting in response to a right shifting clock pulse, the saturated conductive state of the transistors of the cell of its respective cell to the transistors of the cell of the succeeding stage and for driving the transistors of the cell of its respective stage to their cutoff state and a second pair of gates coupled between the stages cell and a preceding cell for shifting in response to a left shifting clock pulse the saturated conductive state of the transistors of the stage's cell to the transistors of the cell of the preceding stage and for driving the transistors of the cell of its respective stage to their cutoff state.

11. The arrangement as recited in claim 10 further including a diode matrix coupled to the cells of the second through the *n*th stages, for providing an indication in binary form of the cell of said stages to which it is connected which is in said saturated conductive state.

12. A low-power shift register comprising:

*n* stages each including first and second transistors of opposite conductivity types interconnected to form a binary memory cell for storing a first binary value when said first and second transistors are in a saturated conductive state and for storing a second binary value when said first and second transistors are in a nonconductive cutoff state wherein no electrical energy is consumed, and at least one pair of clockable transistors including third and fourth transistors; and means including coupling means for coupling said stages to a source of potential and for interconnecting said stages to form a sequence of stages, with the third transistor of each stage coupled to the output of its stage and to a setting input of a succeeding stage to set the first and second transistors of the succeeding stage to their saturated state when a clock pulse is applied to said third transistor if the first and second transistors of its stage are in their saturated state, and the fourth transistor of each stage being coupled to a resetting input of its stage and to an output of the succeeding stage for resetting the first and second transistors of its stage to their nonconductive cutoff state if the first and second transistors of the succeeding stage are set to their saturated conductive state.

13. The arrangement as recited in claim 12 wherein each stage includes a clockable fifth transistor coupled to the third transistor of a succeeding stage for inhibiting said third transistor from being switched to its conductive state when said fifth transistor is switched to its conductive state.

14. The arrangement as recited in claim 13 wherein said *n* stages are connected to said source of potential whereby a stage stores a first binary value when its first and second transistors and the fourth transistor of a preceding stage are in their saturated conductive states.

15. The arrangement as recited in claim 14 wherein each stage includes sixth, seventh and eighth transistors coupled between the stage and a preceding stage, whereby in response to a clock pulse applied to said sixth and seventh transistors the first and second transistors of the preceding stage are switched to their conductive state, and said eighth transistors reset the first and second transistors of its stage when the first and second transistors of the preceding stage are switched to their saturated conductive states.

* * * * *